United States Patent Office 3,291,817
Patented Dec. 13, 1966

3,291,817
POLYMER COORDINATED METAL COMPOUNDS
Jack Rockett, Westfield, N.J., assignor to Esso Research and Engineering Company, a corporation of Delaware
No Drawing. Filed June 20, 1963, Ser. No. 289,441
8 Claims. (Cl. 260—429.9)

The present invention relates to a new composition of matter. In general, it relates to a class of stable coordination compounds. In particular, the present invention relates to coordination compounds formed from polymers containing free amino groups and from certain metal compounds. The present invention also relates to improved lubricating oil compositions containing stable coordination compounds.

Metals whose compounds can be successfully coordinated in accordance with the present invention are zinc, nickel, copper, chromium, cobalt and cadmium. The polymers which may be used in the present invention are those polymers which contain free amino groups in the polymeric chain. The compounds of the present invention may, in some instances, be coordinated by simple addition and stirring of the metal salts and the amino-containing polymer. In other instances, heat may be necessary to form the stable compound. The polymer may contain either a primary, secondary or tertiary amine as the free amino group in the polymeric chain. The polymer may, if desired, be a copolymer wherein the choice of monomers is determined by the incidental properties desired. The only limitations as to the polymer is that it must contain free amino groups in the chain and must be a linear, nonsolid addition polymer. Thus, the percent nitrogen in the form of amino groups in the polymer will be in the range of 0.5 to 25 wt. percent, with a preferred range of 2 to 10 wt. percent. The polymers will have a molecular weight in the range of about 10,000 to about 500,000.

Examples of polymeric compounds for use in the present invention include polymers formed by the polymerization or copolymerization of: ditallow fumarate, dioctyl fumarate, vinyl acetate and β-dimethylaminoethyl methacrylate; methyl methacrylate and β-dimethylaminoethyl methacrylate; ethyl acrylate and β-dimethylaminoethyl methacrylate; ethyl acrylate and t-butylaminoethyl methacrylate; di-$C_8$ oxo fumarate, vinyl acetate, and 2-hydroxy-3-morpholinopropyl allyl ether; di-$C_{13}$ oxo fumarate, vinyl acetate and 2-hydroxy-3-(di-β-hydroxyethyl) aminopropyl allyl ether; methyl methacrylate and vinyl-2-aminoethyl ether; methyl methacrylate and vinyl-2-morpholinoethyl ether; allyl amine; 1,3-octadiene and β-dimethylaminoethyl methacrylate; acrylonitrile and β-dimethylaminoethyl methacrylate; styrene and β-dimethylaminoethyl methacrylate.

In accordance with the present invention, the following amino-containing polymer was prepared.

EXAMPLE 1

A polymer was prepared by the copolymerization of 143.4 g. (0.234 mole) of ditallow fumarate, 191.6 g. (0.564 mole) of dioctyl fumarate, 192.2 g. (2.235 moles) of vinyl acetate and 17.5 g. (0.113 mole) of β-dimethylaminoethyl methacrylate. A catalyst, azo-diisobutyronitrile (0.4 wt. percent of the total monomer weight), was used. The polymerization was carried out at 85 to 90° C. in a nitrogen atmosphere and was complete in about 3½ hours. The polymer was a clear amber-colored viscous oil.

The above examples of polymers contemplated for use in the present invention and the preparation thereof are illustrative only and are not intended to limit the scope of the present invention.

The metal compounds contemplated for use in accordance with the present invention are metal compounds of zinc, chromium, nickel, copper, cobalt and cadmium. Metal compounds which, of themselves, are not soluble in hydrocarbon oils, can be solubilized according to the present invention. For instance, oil insoluble metal salts of dialkyl dithiophosphoric acids containing less than a total of eight carbon atoms in the alkyl groups may be coordinated and thus made oil soluble. A particularly useful class of metal compounds in the present invention are the metal salts of diorgano dithiophosphoric acids.

The following typical examples are representative of diorgano dithiophosphoric acids which may be used in accordance with the present invention:

Dimethyl dithiophosphoric,
Diamyl dithiophosphoric acid,
Methyl ethyl dithiophosphoric acid,
Diisopropyl dithiophosphoric acid,
Di-n-butyl dithiophosphoric acid,
Diisobutyl dithiophosphoric acid,
Di-n-octyl dithiophosphoric acid,
Di-tert-octyl dithiophosphoric acid,
Di-(ethylhexyl) dithiophosphoric acid,
Dinonyl dithiophosphoric acid,
Di-($C_8$ oxo) dithiophosphoric acid,
Dioleyl dithiophosphoric acid,
Dilauryl dithiophosphoric acid,
Di-(methylcyclohexyl) dithiophosphoric acid,
Di-(isopropylcyclohexyl) dithiophosphoric acid,
Diphenyl dithiophosphoric acid,
Di-(tert-octylphenyl) dithiophosphoric acid,
Di-(2,4,6-triisobutylphenyl) dithiophosphoric acid,
Di-(sulfurized oleyl) dithiophosphoric acid, and
Di-(tert-octylphenol sulfide) dithiophosphoric acid.

The preparation of the above-listed diorgano dithiophosphoric acids is well known in the art and is taught for example in the McDermott patent, U.S. 2,283,204. In preparing the diorgano dithiophosphoric acids, normally about 4 moles of alcohol are reacted with about 1 mole of $P_2S_5$. It is to be understood that the diorgano dithiophosphoric acids used in the present invention include not only simple acids, but also mixtures of acids formed by reacting about 1 mole of $P_2S_5$ with about 4 moles of a mixture of alcohols, such, for example, as the mixture of $C_{10}$–$C_{18}$ aliphatic alcohols known as "Lorol" alcohol or a mixture of alcohols and phenols. The alcohols should be essentially free of water. Reaction temperatures are normally in the range of from about 100° F. to about 250° F. and reaction times may range from about 1 to 6 hours.

In accordance with the present invention, the following metal compounds were prepared.

EXAMPLE 2

Zinc O,O'-di(1-methylheptyl) dithiophosphate was prepared by slowly adding 312.5 g. (2.4 moles) of 2-octanol ot a slurry of 133.4 g. (0.6 mole) of phosphorus pentasulfide in 500 cc. of toluene at 80° C. When the reaction was complete, the filtered solution was neutralized with methanolic KOH and evaporated to dryness. The potassium salt (300 g.) was dissolved in water and treated with an aqueous solution of zinc chloride. The separated oil was extracted with benzene, dried, and distilled. There remained 280.0 g. of a clear yellow oil (0.363 mole), a 94.8% yield.

EXAMPLE 3

Zinc O,O'-dibutyl dithiophosphate was prepared by the addition of 4 moles of n-butanol to a slurry of 1 mole of $P_2S_5$ in 800 cc. of toluene. When the reaction was complete the solution was neutralized with methanolic KOH. The methanol and toluene were distilled at reduced pressure leaving 420 g. of the potassium salt. A solution of 292 g. of the potassium salt in water was treated with an aqueous solution of 142.5 g. of zinc chloride. An oil separated which was taken up in benzene, dried, filtered, and distilled. There remained a clear yellow oil which, on standing, slowly separated a crystalline phase. The crystalline material was filtered. The remaining clear amber oil weighed 206.2 g.

EXAMPLE 4

Zinc O,O'-di(1-methylpropyl) dithiophosphate was prepared by the addition of 296.4 g. (4 moles) of secondary butyl alcohol to a slurry of 222.3 g. (1 mole) of phosphorus pentasulfide in 800 cc. of toluene. When the reaction was complete the solution was filtered and neutralized with methanolic KOH. The solvents were distilled at reduced pressure leaving 492.2 g. of the potassium salt, an 87.9% yield. An aqueous solution of 387.1 g. of the potassium salt was treated with an aqueous solution of 103.8 g. of zinc chloride. The separated oil was extracted with benzene, washed, dried, and distilled. There remained 358.7 g. of an oil which later crystallized, 0.656 mole, a 94.9% yield, M.P. 48–49° C.

EXAMPLE 5

A aqueous solution of 95.5 g. (0.379 mole) of commercial potassium diisopropyl dithiophosphate was treated with an aqueous solution of 28.4 g. of zinc chloride. A crystalline precipitate settled out which was filtered and dried. There was obtained 83.8 g. of a basic zinc salt (0.1708 mole), an 89.8% yield, M.P. 138° C.

EXAMPLE 6

Zinc O,O'-di(1,3-dimethylbutyl) dithiophosphate was prepared as follows. To a slurry of 222.3 g. of phosphorus pentasulfide in 800 cc. toluene was slowly added 408.8 g., 4.0 moles, of methyl isobutyl carbinol at 75° C. After three hours at 85° C., all of the phosphorus pentasulfide had reacted. The solution was filtered, neutralized with methanolic potassium hydroxide, and distilled to give 666.3 g. of the crude potassium salt, 1.985 moles, a 99.3% yield. A solution of 412.3 g. of the potassium salt, 1.228 moles, dissolved in 2 liters of water, was extracted twice with hexane. The aqueous layer was now treated with 92.0 g. of zinc chloride dissolved in 200 cc. of water. A heavy oil separated to the bottom. It was extracted with benzene, washed with water, and dried over anhydrous sodium sulfate. Distillation of the solvent left 303.6 g. of a clear yellow oil, 0.460 mole, a 74.9% yield.

EXAMPLE 7

Zinc didecyl dithiophosphate was prepared as follows. In a 2 l. flask were placed 111.2 g., 0.5 mole, of phosphorus pentasulfide and 500 cc. of toluene. The mixture was stirred and heated at 80° C. as 316.6 g., 2.0 moles, of n-decanol was added dropwise. Stirring was continued until all of the phosphorus pentasulfide had dissolved. The solution was cooled and filtered. A solution of 60 g. potassium hydroxide in 300 cc. of methanol was added to the cooled reaction mixture until a pH of 7.5–8.0 was reached. Distillation of the solvents left 139.4 g. of potassium salt, a 92.0% yield. A slurry of 281.7 g. of the potassium salt in warm water was made. To it was added an aqueous solution of 94.1 g. of zinc chloride. An oil formed. The solution was extracted with benzene, washed with water, and dried over anhydrous sodium sulfate. Distillation of the benzene left 269.6 g., 0.305 mole, of a yellow oil, a 97.3% yield.

EXAMPLE 8

Nickel "mixed acid" dithiophosphate was prepared as follows. The potassium salt of the mixed acid dithiophosphate was prepared by adding phosphorus pentasulfide, in the theoretical quantity to a 30/70 weight ratio mixture of isopropyl alcohol and 4-methyl-2-pentanol, filtering the resulting acid and neutralizing it with methanolic potassium hydroxide. Distillation of the volatile solvent gave an amber colored wax. 301.0 g., 1.0 mole, of the potassium salt was dissolved in 1500 cc. water, filtered, and extracted with hexane. The clear aqueous layer was treated with a solution of 160.0 g., 0.55 mole, of nickel (ous) nitrate in 400 cc. of water. A purple oil settled out. It was extracted with benzene, washed with water, and dried over anhydrous sodium sulfate. Distillation of the benzene left 261.9 g., 0.462 mole, of a deep purple oil, a 92.4% yield.

EXAMPLE 9

Copper "mixed acid" dithiophosphate was prepared as follows. The potassium salt was prepared as described in Example 8 (above). The salt, 103.2 g., 0.344 mole, was dissolved in one liter of water. It was filtered and treated with a solution of 47.2 g., 0.189 mole, of cupric sulfate. A heavy brown oil separated. It was extracted with benzene, washed with water, and dried over anhydrous sodium sulfate. Distillation of the benzene left 96.5 g., 0.164 mole, of a dark brown oil, a 95.5% yield.

The relative proportions of polymer to metal compound used in the present invention will be determined by the number of amino nitrogen atoms in the polymer. Thus, the ratio of metal atoms to amino nitrogen atoms will be in the range of about 1/1 to about 0.1/1.

The metal salts prepared in Examples 6, 7, 8 and 9 were coordinated to the amino-containing polymer of Example 1 by simple addition and stirring as follows:

| Composition | Wt. Polymer of Example I, grams | Wt. Metal Salt of Example |
|---|---|---|
| A | 13.4 | 0.99 g., Example 6. |
| B | 13.4 | 1.32 g., Example 7. |
| C | 13.4 | 0.874 g., Example 8. |
| D | 13.4 | 0.88 g., Example 9. |

The stable coordinated compounds prepared above were found to have new and valuable properties as lubricating oil additives. Thus, the compounds were tested for potency as lubricating oil oxidation inhibitors and antiwear additives.

*ASTM–D943–54 oxidation life test*

In this test oxygen is blown through an oil at an elevated temperature of about 95° C. Samples are periodically withdrawn and tested for acidity. When the neutralization number of the sample reaches 2.0, the test is terminated. Results were as follows:

Time to neut. No. of 2.0, hours
1. Base oil [1] (300 g.) _____ <168
2. 295.1 g. base oil plus 4.54 g. polymer (Example 1) _____ <168
3. 295.1 g. base oil plus 4.88 g. of A _____ 1,636
4. 295.0 g. base oil plus 4.99 g. of B _____ 1,863
5. 295.2 g. base oil plus 4.83 g. of C _____ 2,520
6. 295.2 g. base oil plus 4.84 g. of D _____ 2,115

[1] Mineral oil with a viscosity of 32 cs. at 100° F. and 5.4 cs. at 210° F.

*4-ball wear test*

Using the well-known 4-ball wear test, the products of the present invention were tested for antiwear properties. In this test the test lubricant is placed in the cup of the machine and heated to 150° C. The test cup contains three steel balls which are fixed in position by a screw cap. The fourth steel ball held in a chuck is pressed against the three lower balls with a force of 10 kg. and is rotated at 1800 r.p.m. for a period of 1 hour. At the end of the test the amount of wear is determined by measuring the diameter of the wear scar on each of these balls and averaging the results. The results are shown below.

Composition: Wear scar, mm.
1. Base oil (10 grams of a solvent neutral mineral lubricating oil, vis. of 150 SUS @ 100° F. _____ .49
2. 8.56 grams base oil+1.34 g. polymer of Example 1 _____ .48
3. 8.56 grams base oil+1.34 g. composition A __ .26
4. 8.53 grams base oil+1.47 g. composition B __ .26
5. 8.57 grams base oil+1.43 g. composition D __ .28

The above results show that the compositions of the present invention are useful as antioxidants and as antiwear additives in lubricating oil compositions. When used as an antioxidant the additives are added in concentrations ranging from about 0.2 to 5.0 wt. percent, with a preferred concentration of about 1.0 to 2.0 wt. percent. When used as an antiwear additive, the concentration may range from about 1 to 25 wt. percent with a preferred concentration of about 10 to 15 wt. percent.

The additives of this invention may be added to various mineral and synthetic lubricating oil base stocks. The base stock may be any suitable oil of a lubricating viscosity grade, including straight mineral oil fractions or distillates derived from the ordinary paraffinic, naphthenic, asphaltic or mixed base crude oils by the usual refining methods, including solvent extraction, treatment with acid, alkali, clay, aluminum chloride, hydrogenation treatment, etc. Synthetic oils may be of the hydrocarbon type or they may be of the ester type such as di-2-ethylhexyl sebacate, $C_{13}$ oxo acid diesters of tetraethylene glycol, etc.

The additives of the present invention may be employed in lubricants in conjunction with other additives such as detergent-type additives, e.g. metal organic sulfonates, metal alkyl phenol sulfides, etc., pour point depressants, dyes, and the like.

These compounds may be useful as additives in fungicidal, slimicidal, and insecticidal compositions. In addition copper containing compounds may be useful as paint additives. For example, paints containing these compounds may be used for painting ship bottoms to prevent barnacle encrustation.

While several uses have been shown for the products of the present invention, it is not intended that these examples limit or restrict the invention in any manner.

What is claimed is:
1. A stable mineral-oil-soluble coordination compound of an oil-insoluble metal salt of a diorgano dithiophosphoric acid and an oil-soluble, linear, non-solid addition polymer having a molecular weight in the range of from 10,000 to 500,000 and containing at least one free amino group, wherein the total of the carbon atoms in the organo groups is in the range of from 2 to 40, the ratio of metal atoms to amino nitrogen atoms in said coordination compound being in the range of from 1:1 to 0.1:1, said metal being selected from the group consisting of zinc, chromium, nickel, copper, cobalt and cadmium.
2. A compound as defined by claim 1 wherein the total number of carbon atoms in the organo groups is in the range of from 2 to 8.
3. A compound as defined by claim 1 wherein said metal is zinc.
4. A compound as defined by claim 1 wherein said metal is copper.
5. A compound as defined by claim 1 wherein said metal is nickel.
6. A coordination compound of zinc dimethyl dithiophosphate and a polymer of allyl amine.
7. A coordination compound of zinc diorgano dithiophosphate and a copolymer of (a) ditallow fumarate, (b) dioctyl fumarate, (c) vinyl acetate, and (d) β-dimethylaminoethyl methacrylate.
8. A coordination compound of zinc didecyl dithiophosphate and a copolymer of (a) ditallow fumarate, (b) dioctyl fumarate, (c) vinyl acetate, and (d) β-dimethylaminoethyl methacrylate.

References Cited by the Examiner
UNITED STATES PATENTS

| | | | |
|---|---|---|---|
| 1,939,951 | 12/1933 | Buchanan et al. | 260—429 |
| 2,185,480 | 1/1940 | Ulrich et al. | 260—925 X |
| 3,004,996 | 10/1961 | Arakelian et al. | 260—429.9 |
| 3,014,940 | 12/1961 | Lynch et al. | 260—429 |
| 3,074,990 | 1/1963 | Cyba | 260—925 |
| 3,184,412 | 5/1965 | Lowe et al. | 252—46.7 |
| 3,185,645 | 5/1965 | Clayton | 252—46.7 |

TOBIAS E. LEVOW, Primary Examiner.

DANIEL E. WYMAN, HELEN M. McCARTHY, Examiners.

P. P. GARVIN, H. M. S. SNEED, Assistant Examiners.